United States Patent
Day (10) Patent No.: US 10,220,803 B2
(45) Date of Patent: Mar. 5, 2019

(54) VEHICLE BUMPER DAMAGE INDICATION SYSTEM

(71) Applicant: Toyota Motor Engineering & Manufacturing North America, Inc., Erlanger, KY (US)

(72) Inventor: Robert C. Day, Canton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 43 days.

(21) Appl. No.: 15/434,481

(22) Filed: Feb. 16, 2017

(65) Prior Publication Data

US 2018/0194312 A1 Jul. 12, 2018

Related U.S. Application Data

(60) Provisional application No. 62/444,980, filed on Jan. 11, 2017.

(51) Int. Cl.
*B60R 19/48* (2006.01)
(52) U.S. Cl.
CPC ............ *B60R 19/48* (2013.01); *B60R 19/483* (2013.01)
(58) Field of Classification Search
CPC ............................... B60R 19/48; B60R 19/483

USPC .......................................... 293/117, 132, 133
See application file for complete search history.

(56) References Cited

U.S. PATENT DOCUMENTS

| 6,113,178 A | * | 9/2000 | Faigle | B62D 21/152 293/132 |
| 6,142,542 A | * | 11/2000 | Sherno | B60R 19/02 293/102 |
| 6,470,303 B2 | | 10/2002 | Kidd et al. | |

FOREIGN PATENT DOCUMENTS

KR 100765889 B1 10/2007

* cited by examiner

*Primary Examiner* — Joseph D. Pape
(74) *Attorney, Agent, or Firm* — Christopher G. Darrow; Darrow Mustafa PC (57) ABSTRACT

A vehicle bumper damage indication system is provided includes a damage indicator structured to be positionable in a space between a bumper of a vehicle and a body of the vehicle. The damage indicator is structured to be movable between a first configuration and a second configuration. An actuation mechanism is operatively coupled to the damage indicator and is structured to control movement of the damage indicator from the first configuration to the second configuration responsive to a predetermined amount of deflection of a portion of the bumper.

19 Claims, 9 Drawing Sheets

VEHICLE BUMPER DAMAGE INDICATION SYSTEM

CROSS REFERENCE TO RELATED APPLICATIONS

This application claims benefit of U.S. Provisional Application No. 62/444,980, filed Jan. 11, 2017, which is herein incorporated by reference in its entirety.

TECHNICAL FIELD

The present invention to system designed to detect and/or indicate vehicle damage to a user and, more particularly, to a system designed to indicate to a user that a vehicle bumper has been damaged.

BACKGROUND

Vehicle bumper structures may include internal reinforcing members formed from plastic materials, such as glass-filled polymers, which may have relatively little resilience and impact resistance. Reinforcing members formed from such materials may crack after minimal deformation, for example, due to a bumper impact event. Such cracks may propagate until a substantial portion of the bumper reinforcement separates from another portion of the reinforcement. In addition, since the bumper reinforcement may be enclosed within an outer shell, a user may be unaware that the bumper has been damaged, or of the extent of the damage.

SUMMARY

In one aspect of the embodiments described herein, a vehicle bumper damage indication system is provided. The system includes a damage indicator structured to be positionable in a space between a bumper of a vehicle and a body of the vehicle. The damage indicator is structured to be movable between a first configuration and a second configuration. An actuation mechanism is operatively coupled to the damage indicator and is structured to control movement of the damage indicator from the first configuration to the second configuration responsive to a predetermined amount of deflection of a portion of the bumper.

In another aspect of the embodiments described herein, a bumper damage indication system is provided. The system is structured to detect at least a predetermined amount of deflection of a portion of a vehicle bumper. The system includes a damage indicator structured to be positionable in a space between a bumper of a vehicle and a body of the vehicle, and structured to be movable between a first configuration and a second configuration. A spring member is operatively coupled to the damage indicator and is structured to bias the damage indicator toward the second configuration, the second configuration being indicative of an occurrence of at least the predetermined amount of deflection of the portion of the bumper. A retainer is operatively coupled to the damage indicator and is structured to engage the damage indicator to maintain the damage indicator in the first configuration against a force exerted by the spring member prior to an occurrence of the at least a predetermined amount of deflection of the portion of the bumper. The retainer is structured for insertion into a cavity positioned in the bumper. The system is structured such that the retainer extends to a first position within the cavity in which the retainer extends a first distance toward the vehicle body from a surface facing the vehicle body when the retainer is maintaining the damage indicator in the first configuration. The system is also structured such that deflection of the bumper by the at least the predetermined amount causes the retainer to move to a second position within the cavity in which the retainer extends a second distance toward the vehicle body from the surface facing the vehicle body. The second distance is less than the first distance. In addition, movement of the retainer to the second position disengages the retainer from the spring member, thereby permitting the spring member to move the damage indicator from the first configuration to the second configuration.

In another aspect of the embodiments described herein, a vehicle bumper damage indication system is provided. The system includes a housing structured to be positionable in a bumper opposite a body of a vehicle, and a damage indicator mounted on the housing so as to reside between the housing and the body of the vehicle when the housing is positioned in the bumper. The damage indicator is movable between a first configuration and a second configuration. The system also includes an actuation mechanism mounted on the housing and structured to maintain the damage indicator in the first configuration prior to occurrence of at least a predetermined amount of deflection of a portion of the bumper, and structured to cause the damage indicator to move from the first configuration to the second configuration upon occurrence of the at least a predetermined amount of deflection of the portion of the bumper. The second configuration indicates the occurrence of the at least a predetermined amount of deflection of the portion of the bumper.

DETAILED DESCRIPTION

Embodiments described herein relate to a vehicle bumper damage indication system. The system includes a damage indicator structured to be positionable in a space between a bumper of a vehicle and a body of the vehicle. The damage indicator is structured to be movable between a first configuration and a second configuration. The second configuration indicates that the bumper has been damaged. An actuation mechanism is operatively coupled to the damage indicator and is structured to control movement of the damage indicator from the first configuration to the second configuration responsive to a predetermined amount of deflection of a portion of the bumper. The damage indicator may be coupled to a heads up display to indicate to a user inside the vehicle that the damage indicator has moved from the first configuration to the second configuration.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

FIGS. 1-8 show various embodiments of a bumper damage indication system (generally designated 20) incorporated into a vehicle 11. Embodiments of the bumper damage indication system described herein are intended for use on vehicles having a gap or space formed between one or more vehicle bumpers and the vehicle body. One example of such a vehicle is the pickup truck 11 shown in FIG. 8. Truck 11 has a space 13 formed between the rear bumper 14 and the vehicle body 16. The bumper damage indication system 20 may be structured to operate within this space, and to provide a visual indication of deformation and damage to an associated bumper.

Figure 8:
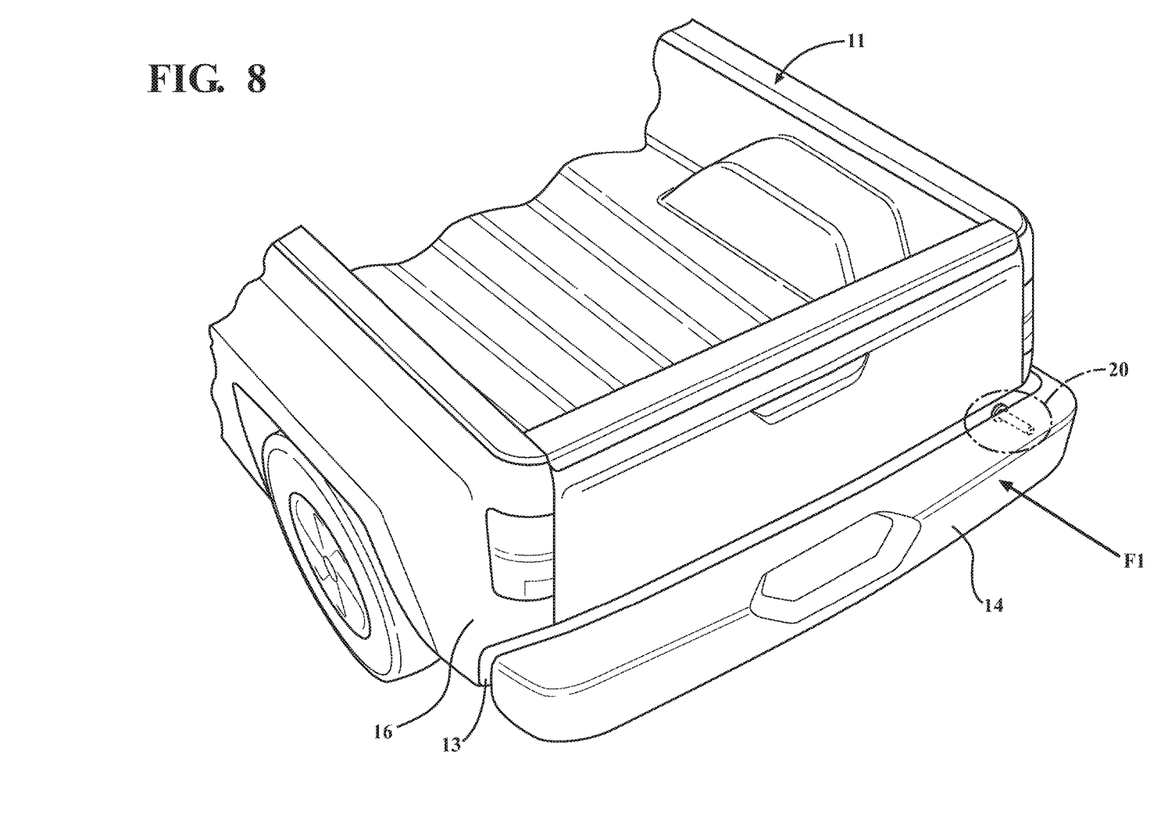
FIG. 8 is a schematic perspective view of a pickup truck incorporating a bumper damage indication system in accordance with an embodiment described herein.

Although the system 20 is shown positioned so as to detect and indicate damage to the rear bumper 14, it is noted that an embodiment of the system 20 may be positioned so as to detect and visibly indicate to an observer damage to any other vehicle bumper or portion of the vehicle 11 structured to absorb an impact, and which is spaced apart from the vehicle body 16.

Figure 1:
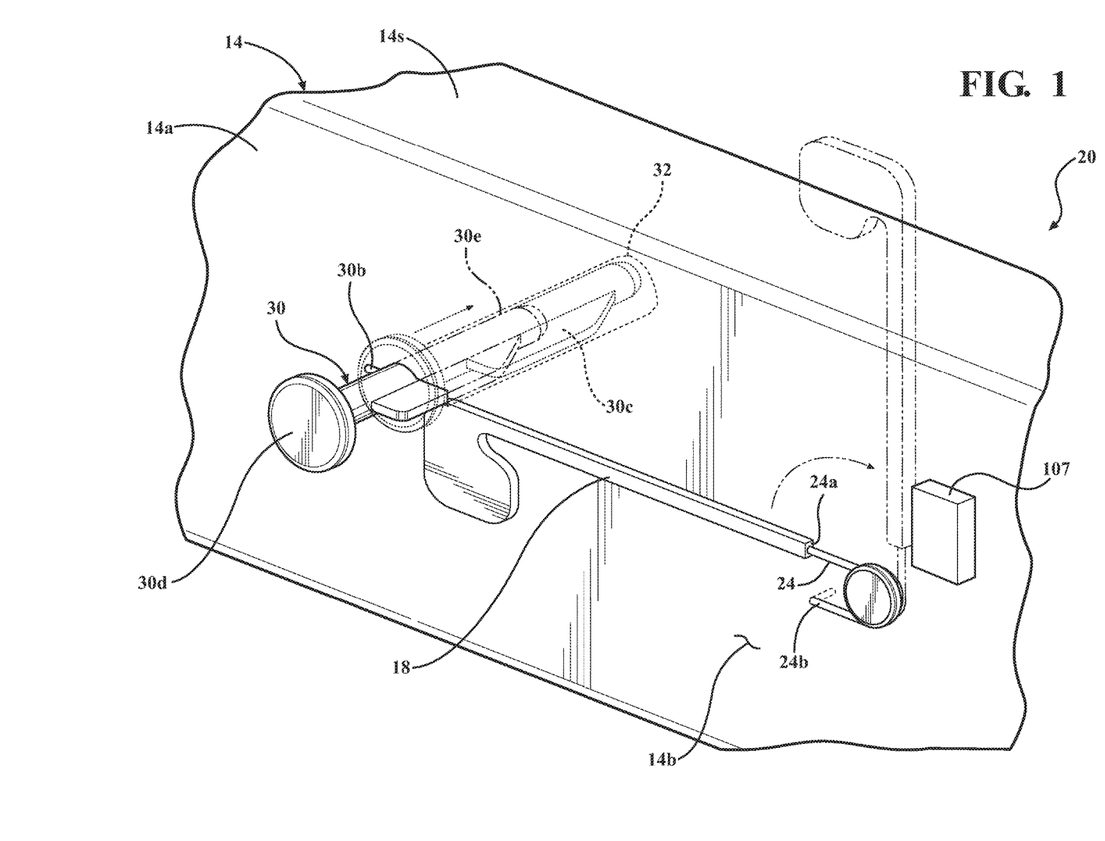
FIG. 1 is a perspective view of a bumper damage indication system in accordance with one embodiment described herein.

FIG. 1 is a perspective view of a bumper damage indication system in accordance with one embodiment described herein. Referring to FIG. 1, in one or more arrangements, bumper damage indication system 20 may be installed in the bumper 14 and includes a damage indicator 18 structured to be partially positionable in a space 13 (seen, for example, in FIGS. 3A and 3B) between the bumper 14 and the body 16 of the vehicle. The damage indicator 18 may be structured to be movable between a first configuration C1 (shown in FIGS. 3A and 4A) and a second configuration C2 (shown in FIGS. 3B and 4B).

The damage indicator 18 resides in the first configuration C1 prior to a deflection of the bumper (for example, due to an impact on the bumper) which may cause damage to the bumper. In the first configuration C1, the damage indicator 18 may reside in the space 13 between the bumper 14 and the vehicle body 16 and may not be visible to an observer. The damage indicator 18 may reside in the first configuration C1 until the portion of the bumper in which the damage indication system 20 is installed experiences sufficient deflection to cause the damage indicator 18 to move from the first configuration C1 to the second configuration C2, as described herein.

In the second configuration C2, the damage indicator 18 may extend outwardly from the space 13 between the vehicle bumper 14 and the vehicle body 16 so as to provide a visual indication of bumper deflection. In a particular embodiment, the damage indicator 18 resides below an uppermost exterior surface 14s of the bumper 14 when the damage indicator 18 is in the first configuration C1, and a portion of the damage indicator 18 extends above the uppermost exterior surface 14s of the bumper 14 when the damage indicator 18 is in the second configuration C2.

An actuation mechanism is operatively coupled to the damage indicator 18. The actuation mechanism may be structured to control movement of the damage indicator 18 from the first configuration C1 to the second configuration C2 responsive to the predetermined amount of deflection of the portion 14a of the bumper 14 into which the damage indication system 20 is incorporated. The actuation mechanism may include an actuator operatively coupled to the damage indicator 18 and structured to exert a force on the damage indicator 18 biasing the damage indicator toward the second configuration C2. In one or more embodiments, the actuator may be a spring member 24, such as a coil spring member. The spring member may support and enable rotation of the damage indicator 18 with respect to the bumper 14, in the manner described herein.

In the embodiment shown in the drawings, the spring member has a first end 24a attached to the damage indicator 18, and a second end 24b mountable to the bumper 14. The spring member first end 24a may be molded into or otherwise secured to the damage indicator 18. The spring member second end 24b may be positionable and securable inside a suitable cavity (not shown) formed in the bumper 14, to anchor the end 24b of the spring member.

The bumper damage indication system 20 may further include a retainer 30 operatively coupled to the damage indicator 18. The retainer may be structured to maintain the damage indicator 18 in the first configuration C1 against a biasing force exerted by the actuator 24, prior to the predetermined amount of deflection of the portion of the bumper 14.

The retainer 30 may have a body portion 30a, a breakable portion 30b projecting from the body portion 30a, and a damage indicator engagement portion 30c extending from the body portion 30a. The body portion may have a first end 30d and a second end 30e opposite the first end 30d.

A cavity 32 may be provided for receiving the retainer 30 therein. The cavity 32 may have sufficient depth to enable the retainer 30 to move farther into the cavity and to occupy various positions within the cavity during operation of the bumper damage indication system 20 as described herein. In one or more arrangements, the cavity 32 may be formed in the bumper 14. In one or more arrangements, the cavity 32 may be formed in housing formed separately from the bumper.

Figure 3A:
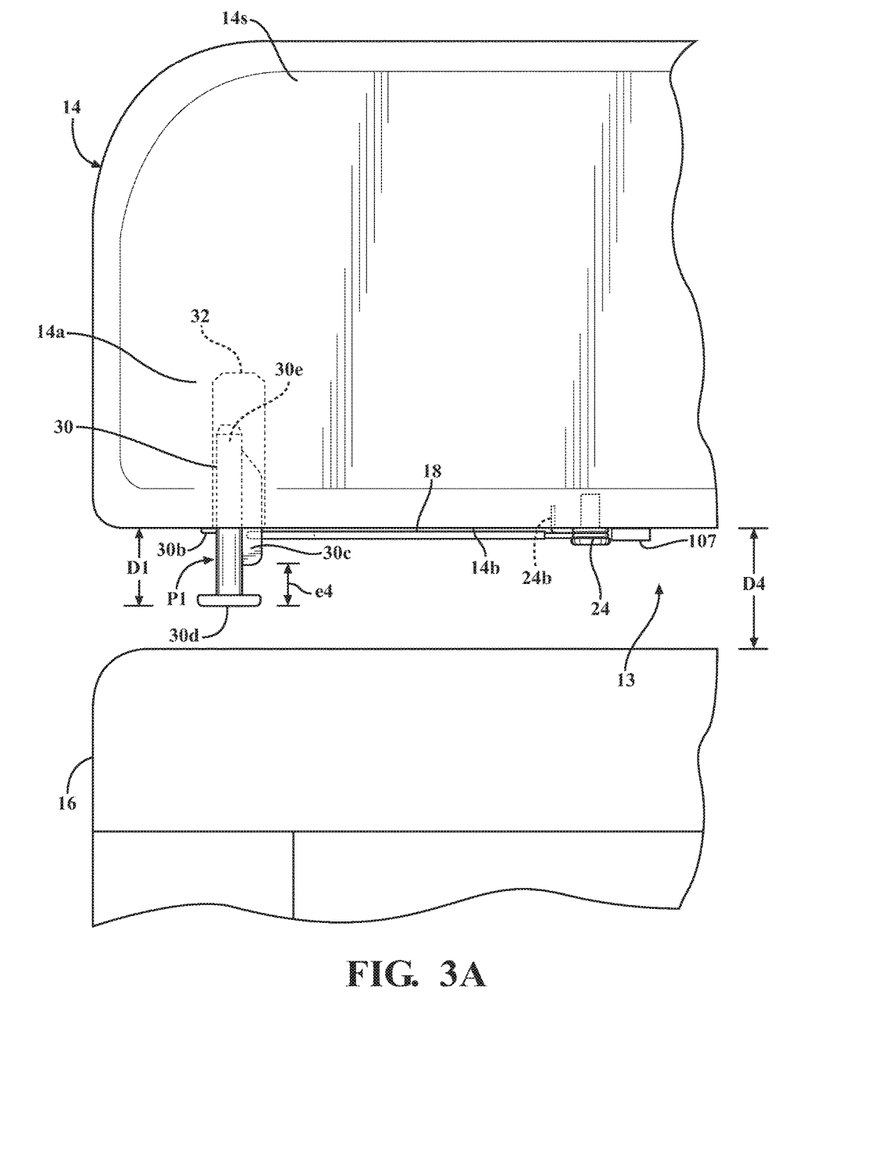
FIG. 3A is a schematic plan view of a portion of a vehicle into which an embodiment of the bumper damage indication system is incorporated, prior to an impact on the vehicle bumper and actuation of the damage indication system.
Figure 3B:
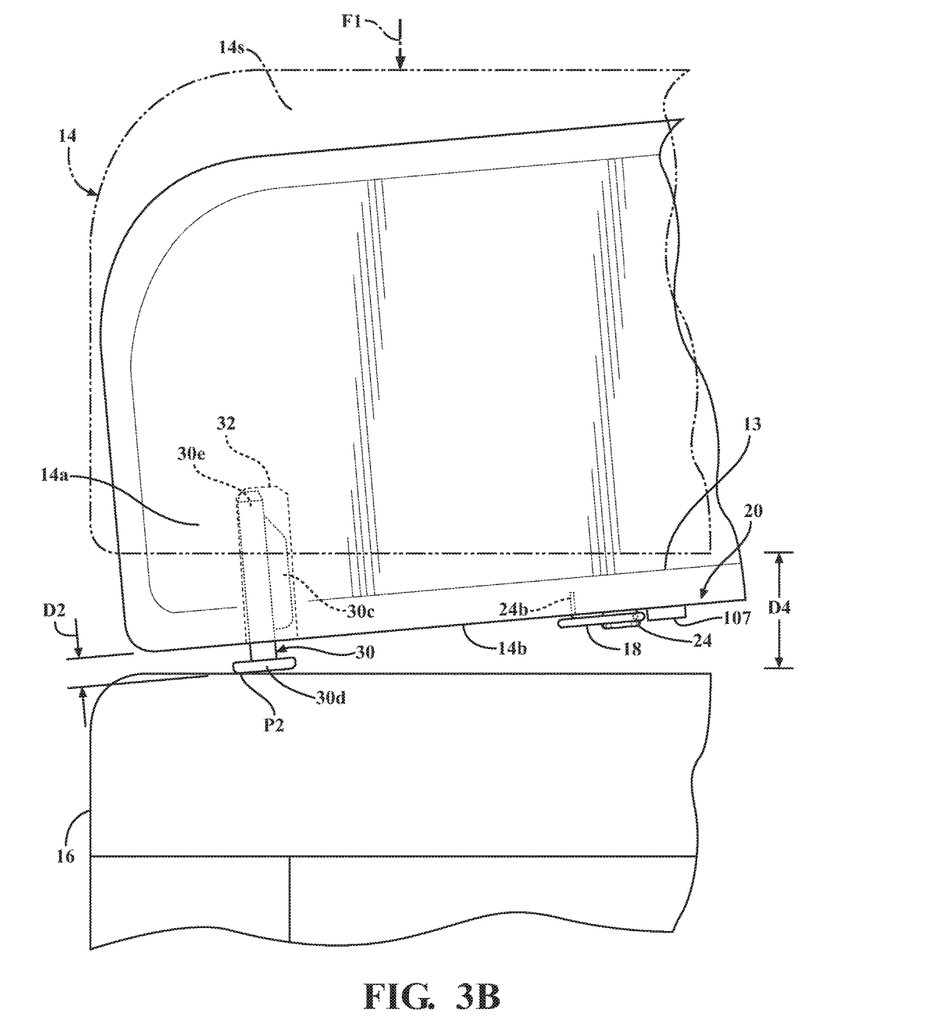
FIG. 3B is the schematic plan view FIG. 3A, shown after an impact on the vehicle bumper and actuation of the damage indication system to indicate bumper damage.

Referring to FIG. 3A, the damage indication system 20 may be structured such that the retainer 30 is in a first position P1 within the cavity 32 prior to bumper deflection. In this position P1, the retainer 30 extends a first distance D1 toward the vehicle body 16 from a surface 14b of the bumper facing the vehicle body 16 when the retainer 30 is maintaining the damage indicator 18 in the first configuration. The first position P1 is determined so that the damage indicator engagement portion 30c engages the damage indicator 18 prior to deflection of the bumper 14, to maintain the damage indicator 18 in the first configuration C1.

The breakable portion 30b may be structured to maintain the retainer 30 in the first position P1 prior to the predetermined amount of deflection of the portion of the bumper 14. The breakable portion 30b may be located along the length of the retainer 30 such that the breakable portion 30b will contact and bear against surface 14b of the bumper when the retainer 30 is in the first position P1 in the cavity 32. Thus, the breakable portion 30b may be used to initially position and maintain the retainer 30 at a desired position within the cavity 32.

The breakable portion 30b is structured to prevent insertion of the retainer 30 deeper into cavity 32 due to forces (such as vibration, for example) other than impact forces sufficient to deflect the portion 14a of the bumper 14 the predetermined amount toward the vehicle body.

The breakable portion 30b is also designed to break responsive to deflection of the portion 14a of the bumper 14 bringing the retainer 30 into contact with the vehicle body and causing the retainer 30 to be forced deeper into cavity 32.

The damage indicator engagement portion 30c may be structured and positioned along a length of the retainer body portion 30a so as to engage the damage indicator 18 when the retainer 30 is positioned in the first position P1 within the cavity 32. When the engagement portion 30c engages the damage indicator 18, the damage indicator is maintained in the first configuration C1 shown in FIGS. 3A and 4A. That is, the damage indicator 18 is prevented from moving into the second configuration C2 shown in FIGS. 3B and 4B under influence of the force exerted by actuator 24.

The damage indication system 20 may be structured such that deflection of the portion 14a of the bumper the predetermined amount pushes the retainer 30 to a second position P2 within the cavity 32. P1 may be the position of the retainer 30 in the cavity prior to bumper deflection and actuation of the damage indication system, while P2 may be the final position of the retainer 30 in the cavity resulting from bumper deflection. D1 may be a distance the retainer 30 extends from surface 14b of the bumper facing the vehicle body 16, prior to actuation of the damage indication system. D2 may be a distance the retainer 30 extends from surface 14b after to actuation of the damage indication system and when the retainer 30 is in its final, post-impact position within cavity 32, with the second distance D2 being less than the first distance D1.

The damage indicator engagement portion 30c may be structured to disengage from the damage indicator when the retainer 30 moves from the first position P1 to the second position P2 within the cavity 32, thereby permitting the actuator biasing force to move the damage indicator from the first configuration C1 to the second configuration C2. In the position P2, the retainer extends a second distance D2 toward the vehicle body 16 from the surface 14b of the bumper 14 facing the vehicle body 16, the second distance D2 being less than the first distance D1.

The damage indication system 20 may be structured to detect and indicate to a user the occurrence of at least a predetermined amount of deflection of the portion 14a of the bumper 14 in which the damage indication system 20 is installed. The distance D1 may be controlled so as to control the amount of bumper deflection which will trigger movement of the retainer 30 deeper into the cavity 32, resulting in movement of the damage indicator 18 from the first configuration C1 to the second configuration C2. The amount of bumper deflection at which the damage indication system 20 actuates may be varied according to the requirements of a particular application.

Figure 5A:
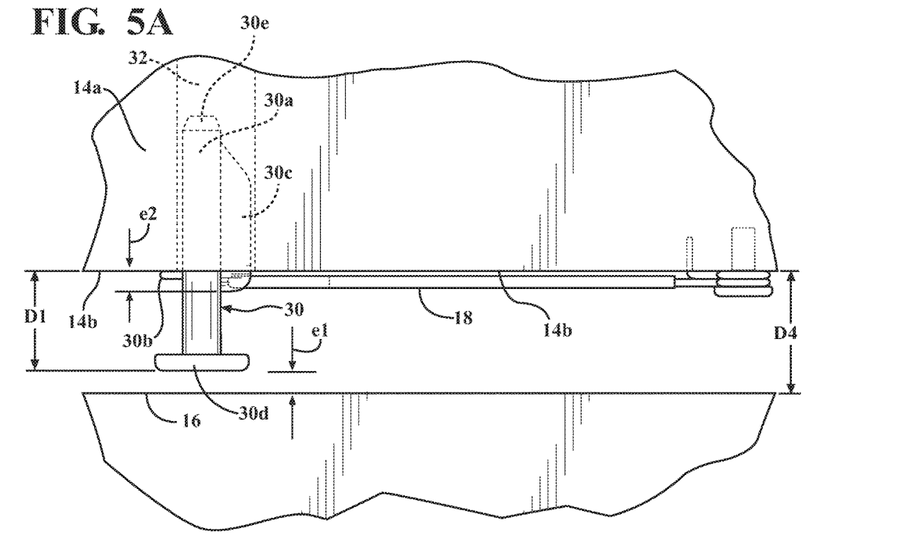
FIG. 5A is a schematic plan view of a portion of a vehicle into which another embodiment of the bumper damage indication system is incorporated, prior to an impact on the vehicle bumper and actuation of the damage indication system.
Figure 5B:
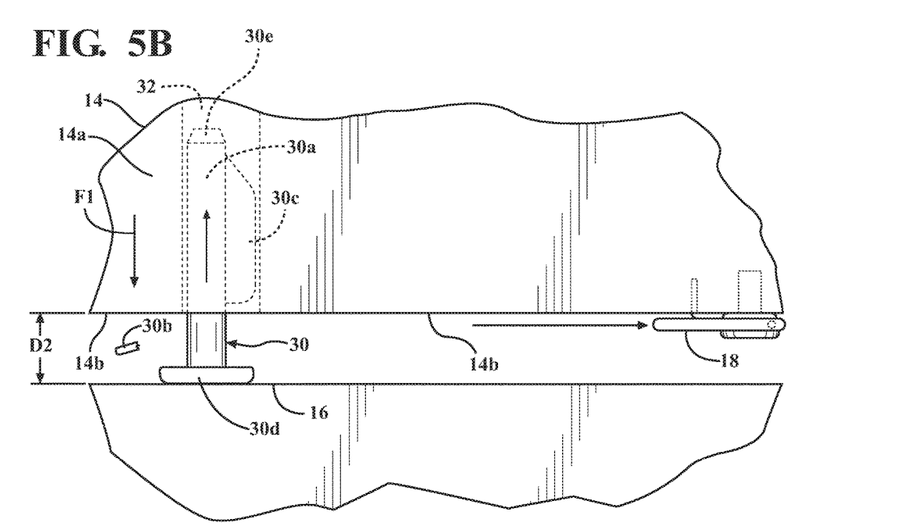
FIG. 5B is the schematic plan view FIG. 5A, shown after an impact on the vehicle bumper and actuation of the damage indication system to indicate bumper damage.

For example, FIG. 5A shows a first embodiment of the retainer 30 in a first position within cavity 32 (i.e., a position in which the retainer acts to maintain the damage indicator in the first configuration C1). This embodiment is structured to enable detection of a relatively smaller deflection of the portion 14a of the bumper 14. As seen in FIGS. 5A-5B, the retainer 30 may be structured so that the retainer first end 30d is located relatively close to vehicle body 16 (or in contact with vehicle body 16) so that any deflection experienced by bumper portion 14a will, as soon as possible, cause the retainer first end 30d to contact the vehicle body. Referring to FIG. 5B, contact with the vehicle body 16 pushes the retainer 30 (including damage indicator engagement portion 30c) farther into cavity 32, fracturing the breakable portion 30b and causing the damage indicator engagement portion 30c to disengage from the damage indicator 18. This releases the damage indicator 18 to rotate from the first configuration C1 to the second configuration C2.

In the embodiment shown, e2 is the distance the damage indicator engagement portion 30c extends outside the cavity 32 prior to bumper deflection. Thus, the retainer 30 needs to move a distance of at least e2 farther into cavity 32 to disengage the damage indicator engagement portion 30c from the damage indicator 18. To make contact with the body of the vehicle, the retainer first end must travel a distance e1, which is the clearance between the retainer 30 and the vehicle body 16 prior to bumper deflection. Thus, the bumper 14 must be deflected toward the vehicle by an amount of at least e1+e2 to disengage the damage indicator engagement portion 30c from the damage indicator 18.

Figure 4A:
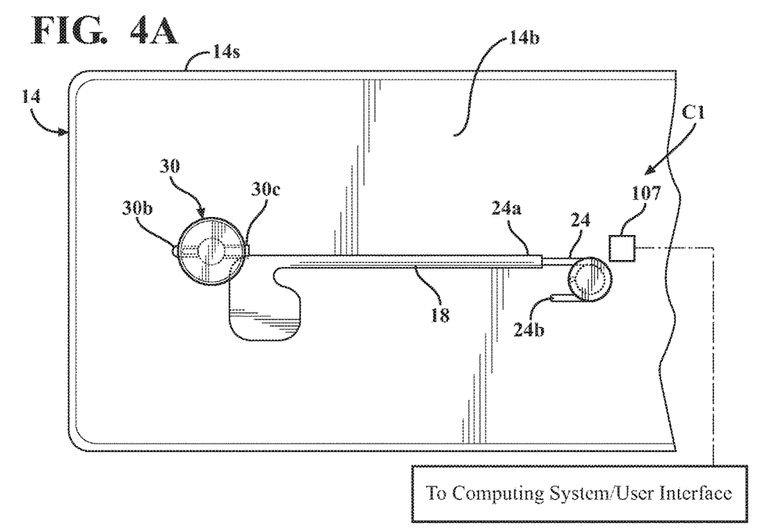
FIG. 4A is a frontal scFIG. hematic view of the bumper shown in FIGS. 3A and 3B, prior to impact on the vehicle bumper and actuation of the damage indication system.
Figure 4B:
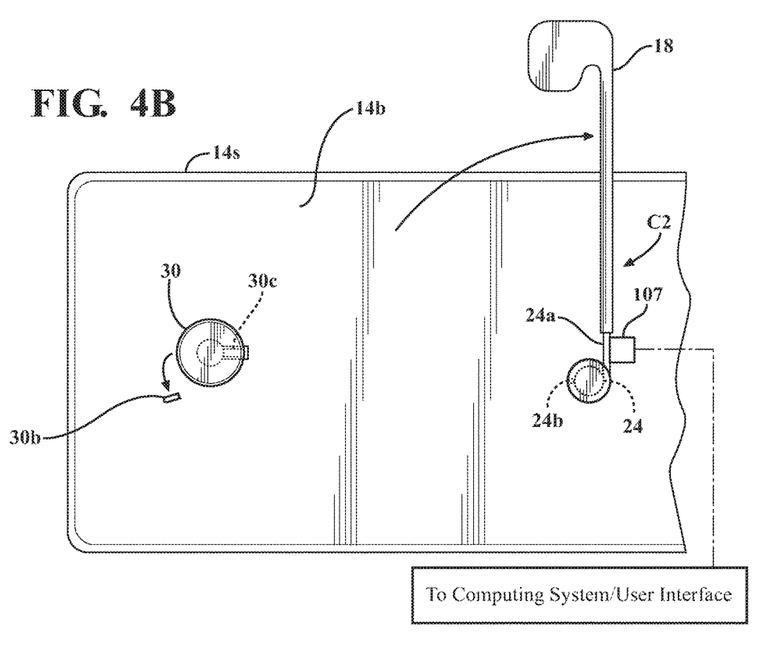
FIG. 4B is the frontal schematic view of FIG. 4A, shown after impact on the vehicle bumper and actuation of the damage indication system.

As seen in FIG. 4B, at least a portion of the damage indicator 18 may reside above an uppermost exterior surface 14s of the bumper 14 when the damage indicator 18 is in the second configuration C2. In this configuration, the damage indicator 18 is visible to an observer viewing the bumper 14 and thus serves as a visible indicator of bumper damage.

Figures 6A, 7:
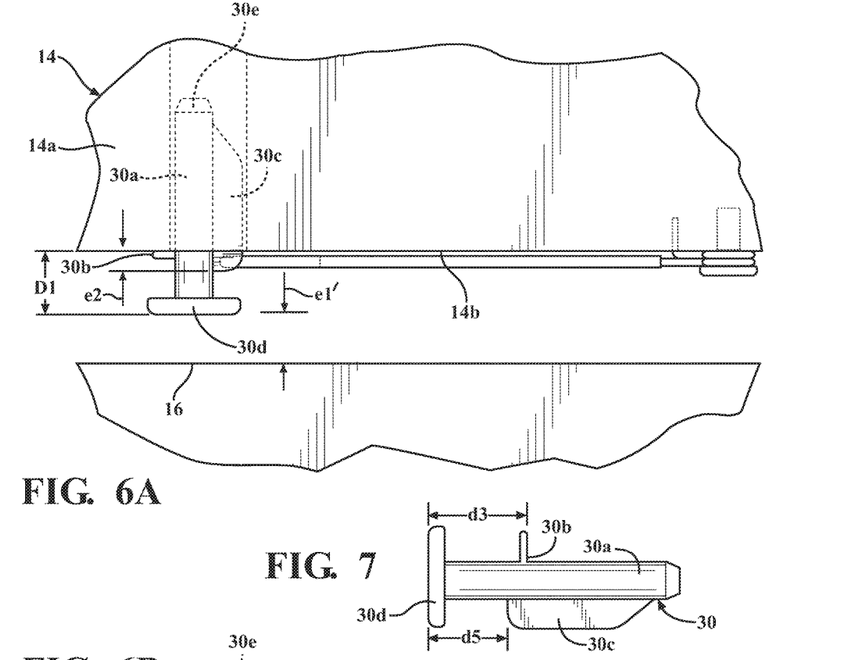
FIG. 6A is a schematic plan view of a portion of a vehicle into which another embodiment of the bumper damage indication system is incorporated, prior to an impact on the vehicle bumper and actuation of the damage indication system.
FIG. 7 is a schematic side view of a retainer in accordance with an embodiment described herein.
Figure 6B:
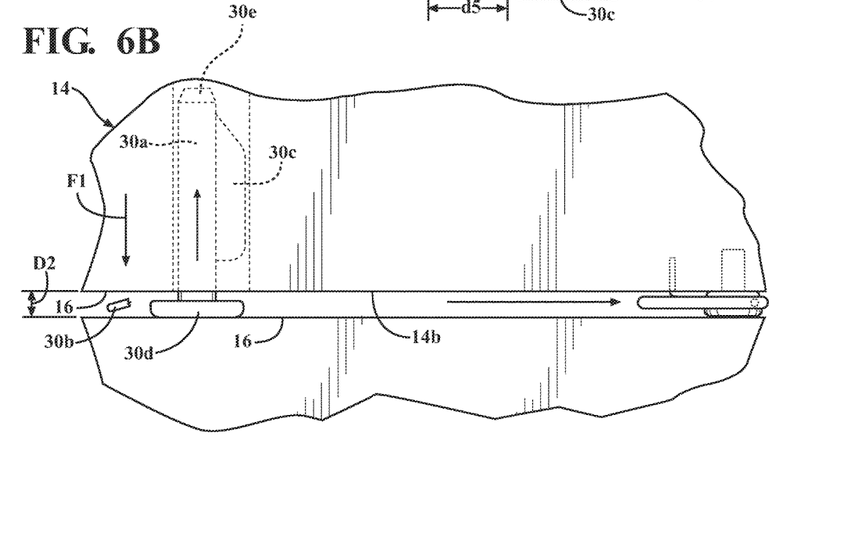
FIG. 6B is the schematic plan view FIG. 6A, shown after an impact on the vehicle bumper and actuation of the damage indication system to indicate bumper damage.

FIG. 6A shows a second embodiment of the retainer 30 in a first position within cavity 32. This embodiment is structured to detect and notify a user of a relatively larger deflection of the portion 14a of the bumper 14. As seen in FIGS. 6A-6B, the retainer 30 may be structured so that the retainer first end 30d is located relatively farther from vehicle body 16 than the previously described embodiment, so as to permit a relatively larger deflection of bumper portion 14a to occur before the retainer first end 30d contacts the vehicle body 16.

Referring to FIG. 6B, contact with the vehicle body 16 pushes the retainer 30 (including damage indicator engagement portion 30c) farther into cavity 32, fracturing the breakable portion 30b and causing the damage indicator engagement portion 30c to disengage from the damage indicator 18. This releases the damage indicator 18 to rotate from the first configuration C1 to the second configuration C2.

In the embodiment shown in FIGS. 6A and 6B, the bumper 14 must be deflected toward the vehicle by an amount of at least e1'+e2 to disengage the damage indicator engagement portion 30c from the damage indicator 18, where e1' is the clearance between the retainer first end 30d and the vehicle body 16 prior to bumper deflection, and e2 is the distance the damage indicator engagement portion 30c extends outside the cavity 32 prior to bumper deflection. In addition, distance e1' is greater than the distance e1 in the embodiment previously described with respect to FIGS. 5A-5B.

Referring to FIGS. 5-7, the "e" dimensions (such as dimensions e1, e1' previously described) in the damage indication system 20 may be controlled by controlling the distance d5 from the first end 30d of the retainer 30 to an edge of the damage indicator engagement portion 30c closest to the end 30d of the retainer. In addition, the distance d5 and the distance D1 to which the retainer 30 extends from the surface 14b of the bumper 14 prior to actuation may be controlled in accordance with the dimension D4 (the spacing between the bumper 14 and the vehicle body 16 proximate the portion 14a of the bumper where the damage indication system 20 is installed, prior to bumper deflection) for any particular application. For example, where the spacing D4 is relatively smaller, the distance d5 may be specified so to enable the distance D1 to be made relatively smaller. The distance d3 may be the distance from the end 30d of the retainer 30 to an edge of the breakable portion 30b which bears against the surface 14b when the retainer 30 is in its first position P1. The dimension d3 may also be adjusted as required to provide a desired extension of the retainer past the surface 14b for a given application.

Retainer 30 may be structured to form an interference fit with the walls of cavity 32. The interference fit may be designed to ensure that the retainer will be pressed into the cavity 32 only under influence of the anticipated contact forces between the vehicle body 16 and the retainer 30, which may be produced by deflection and motion of the bumper toward the vehicle body. Thus, the interference fit is designed to prevent movement of the retainer due to bumper vibration or other non-contact forces.

The retainer 30 may be formed from any suitable material, for example, a polymer or a metallic material. The material from which the retainer 30 is formed may be selected so as to ensure that the dimensions and structure of the retainer are maintained when the forces described herein are applied to the retainer. For example, where the retainer 30 is to be mounted in a cavity 32 formed in a resin or polymeric bumper part, the retainer 30 may be formed from a relatively harder material than the bumper part to ensure that the retainer 30 may be pressed into the cavity 32 as described without breakage or bending that may prevent proper functioning of the retainer. The specifics of the retainer material (for example, composition and surface finish) may also be selected with consideration of the coefficient of friction between the cavity walls and the retainer material, which may affect movement of the retainer 30 within the cavity. The interference fit and retainer material parameters for a particular application may be determined analytically or iteratively, through experimentation, using known methods.

The second position P2 is a position of the retainer 30 in which the damage indicator engagement portion 30c is disengaged from the damage indicator 18, thereby permitting the actuator 24 to move the damage indicator 18 from the first configuration C1 to the second configuration C2. For example, as seen in FIGS. 5B and 6B, after contact with the bumper 16 has pushed the retainer 30 father into the cavity 32, the damage indicator engagement portion 30c of the retainer 30 is recessed within the cavity or otherwise disengaged from the damage indicator 18. This permits the damage indicator 18 to move to the second configuration C2.

Any holes or cavities (such as cavity 32) needed for the mounting of the bumper damage indication system components to the bumper 14 may be provided using any suitable means. For example, the cavities may be molded, drilled, or otherwise formed into the bumper 14.

Figure 2:
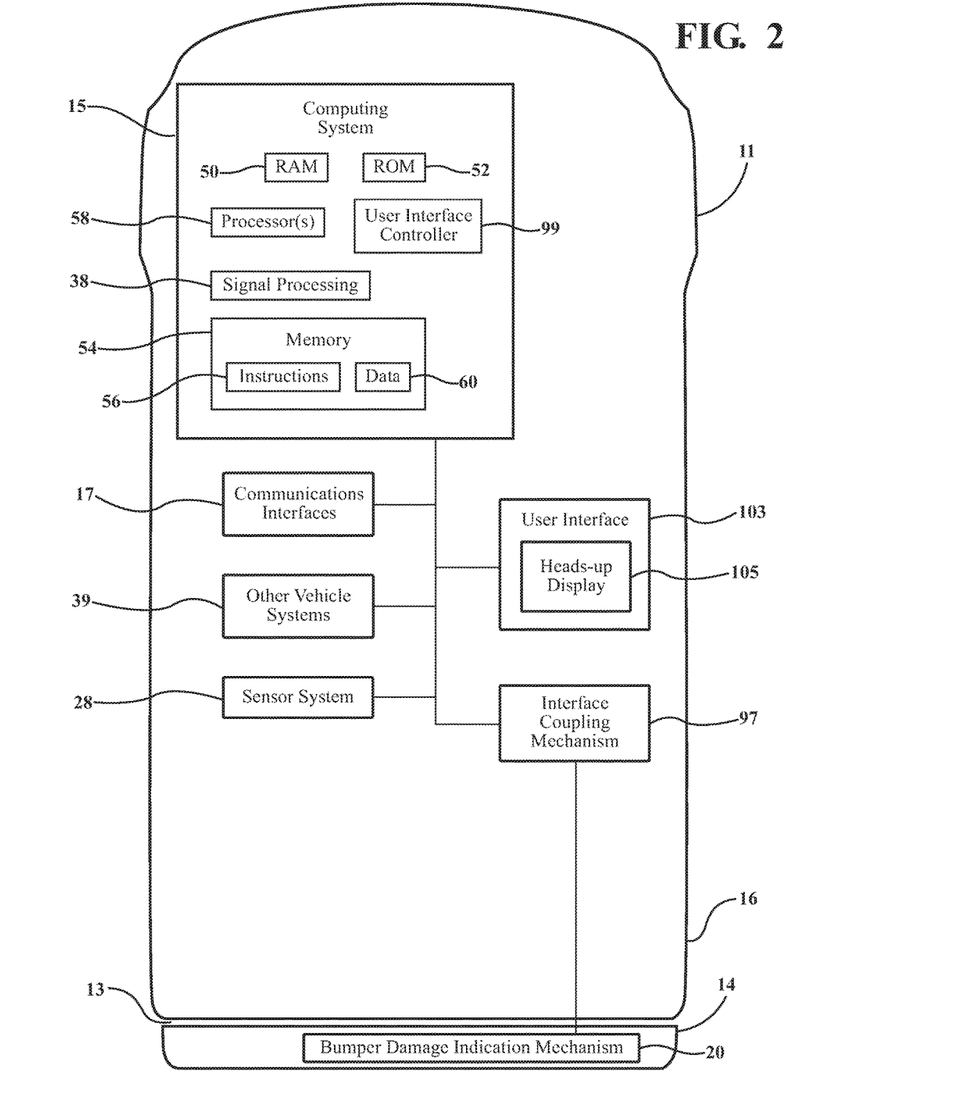
FIG. 2 is a block schematic diagram of a vehicle incorporating an embodiment of the bumper damage indication system described herein.

FIG. 2 is a schematic diagram of a vehicle incorporating an embodiment of the bumper damage indication system described herein. The vehicle 11 may include various systems, subsystems and components in operative communication with each other, such as a sensor system or array 28, a computing system 15, an embodiment of the bumper damage indication mechanism 20 described herein, an interface coupling mechanism 97, and other systems and components (generally designated 39) needed for operating the vehicle as described herein. The vehicle 11 may include more or fewer subsystems and each subsystem could include multiple elements.

The computing system 15 may be operatively connected to the other vehicle systems and elements and otherwise configured so as to affect control and operation of the vehicle 11 and its components as described herein, based on inputs and/or information received from various vehicle systems and/or components and/or from any other suitable source of information.

FIG. 2 illustrates a block diagram of an exemplary computing system according to one or more illustrative embodiments of the disclosure. The computing system 15 may have some or all of the elements shown in FIG. 2. In addition, the computing system 15 may also include additional or alternative components as needed or desired for particular applications. The computing system 15 may also represent or be embodied in a plurality of controllers or computing devices that may process information and/or serve to control individual components or subsystems of the vehicle 11 in a distributed fashion.

The computing system 15 may include one or more processors 58 (which could include at least one microprocessor) for controlling overall operation of the computing system 15 and associated components, and which execute instructions stored in a non-transitory computer readable medium, such as the memory 54. "Processor" means any component or group of components that are configured to execute any of the processes and/or process steps described herein or any form of instructions to carry out such processes/process steps or cause such processes/process steps to be performed. The processor(s) 58 may be implemented with one or more general-purpose and/or one or more special-purpose processors. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other. In one or more arrangements, the processor(s) 58 can be a main processor of the vehicle 11. For instance, the processor(s) 58 can be part of an electronic control unit (ECU).

In some embodiments, the computing system 15 may include RAM 50, ROM 52, and/or any other suitable form of computer-readable memory. The memory 54 may comprise one or more computer-readable memories. A computer-readable storage or memory 54 includes any medium that participates in providing data (e.g., instructions), which may be read by a computer. Such a medium may take many forms, including, but not limited to, non-volatile media, volatile media, etc. The memory 54 can be a component of the computing system 15, or the memory can be operatively connected to the computing system 15 for use thereby. The term "operatively connected," as used throughout this description, can include direct or indirect connections, including connections without direct physical contact.

The memory 54 may contain data 60 and/or instructions 56 (e.g., program logic) executable by the processor(s) 58 to execute various functions of the vehicle 11, including those described herein in connection with an embodiment of the bumper damage indication mechanism 20. The memory 54 may contain additional instructions as well, including instructions to transmit data to, receive data from, interact with, or control one or more of the other vehicle systems and/or components.

Any control capabilities of computing system may be stored in memory 54 and/or in other memories and implemented in the form of computer-readable program code that, when executed by a processor, implement one or more of the various processes, instructions or functions described herein.

Communications interfaces 16 may be configured to allow interaction between vehicle 11 and external sensors, other vehicles, other computer systems, and various external messaging and communications systems (such as a satellite system or cellular phone/wireless communication system), for example. The communications interfaces 16 may also be configured to receive a signal from a wireless transmitter or device in operative communication with the user interface coupling mechanism 97. The signal may indicate that the damage indicator 18 is in the second configuration C2. The signal may be a wireless signal generated responsive to closure of a switch or electrical contact as described below, when the damage indicator 18 moves from the first configuration C1 to the second configuration C2. The communications interfaces 16 may include (or be operatively connected to) one or more transceivers, digital signal processors, and additional circuitry and software for communicating with the transceiver.

In a known manner, the vehicle sensors 28 may provide data used by the computing system 15 in formulating and executing suitable control commands for the various vehicle systems. Sensors of the sensor system 28 can be operatively connected to the computing system 15 and/or any other element of the vehicle 11. Vehicle sensors 28 also may include cameras and/or proximity sensors capable of recording additional conditions inside or outside of the vehicle.

If a signal indicating that the damage indicator 18 is in the second configuration C2 requires pre-processing prior to use by the computing system 15 or user interface controller 99, a known or suitable processing means (for example, an analog-to-digital (A/D) converter or digital-to-analog (D/A) converter) may be incorporated into the vehicle 11 for processing the signal prior to use by the computing system 15 or user interface controller 99. Similarly, if operation of the user interface to provide a message to a user will require processing of a control signal received from the computing system or interface controller 99 prior to use by the user interface 103, a known or suitable processing means 38 may be incorporated into the vehicle for processing the signal prior to transmission to the user interface 103.

A user interface coupling mechanism 97 may be provided for operatively coupling the damage indicator 18 to vehicle user interface 103. The user interface coupling mechanism 97 may be configured to provide a signal indicating that the damage indicator 18 is in the second configuration C2. In one or more arrangements, the user interface coupling mechanism 97 may include or may be operatively coupled to a switch or electrical contact (such as switch 107 in FIGS. 3A-4B) structured to be closed by positioning of the damage indicator 18 in the second configuration C2. The user interface coupling mechanism 97 may also include or may be operatively coupled to an electrical conductor (such as a discrete wire or a wire incorporated into an existing wiring harness) (not shown) connected to the switch 107 and to computing system 15 or to user interface controller 99. The electrical conductor may enable transmission of the signal from the user interface coupling mechanism 97 indicating that the damage indicator 18 is in the second configuration C2.

In one or more arrangements, the user interface coupling mechanism 97 may include a transmitter (not shown) in operative communication with electrical switch 107. The transmitter may be configured to transmit a wireless signal upon closure of electrical switch 107. The signal may indicate that the damage indicator 18 is in the second configuration C2. Any of a variety of mechanisms other than those described may also be used to communicate to the user interface that the damage indicator 18 has moved to the second configuration C2.

The user interface 103 may be configured for providing information to (or receiving input from) a user of the vehicle 11. For example, the user interface 103 may include a voice/audio interface (not shown) (for example, a microphone and speaker for providing audio input and output), keypad, touch screen, and/or stylus through which a user of the computing system 15 may provide input. The user interface 103 may include and a video display device (not shown) for providing textual, audiovisual and/or graphical output from the computing system.

In one or more arrangements, the user interface 103 may include a head-up display 105 configured to provide an indication to a driver and/or other vehicle user when the damage indicator 18 is in the second configuration C2. The user interface controller may be configured to control the head-up display 105 to display the damage indicator status indication responsive to receipt of a signal from the user interface coupling mechanism 97 that the damage indicator is in the second configuration C2.

A user interface controller 99 may control various aspect of the user interface in a known manner to display vehicle status parameters to a user, and to receive and convey user commands or requests to the vehicle computing system 15 or to other vehicle systems or components. User interface controller 99 may be in the form of one or more hardware and/or software elements incorporated into vehicle computing system 15 as shown in FIG. 2, or the controller 99 may be incorporated into the vehicle as a separate computing system communicatively coupled to the vehicle computing system 15, the interface coupling mechanism 97, the user interface 103, and the bumper damage indication system 20. Alternatively, the user interface controller 99 may be incorporated into the user interface 103.

The user interface controller 99 may be configured to receive (either directly or indirectly) a signal from the user interface coupling mechanism 97 indicating that the damage indicator 18 is in the second configuration C2, and to control the user interface 103 so as to provide a message directed to a user indicating the damage indicator status.

Figure 9:
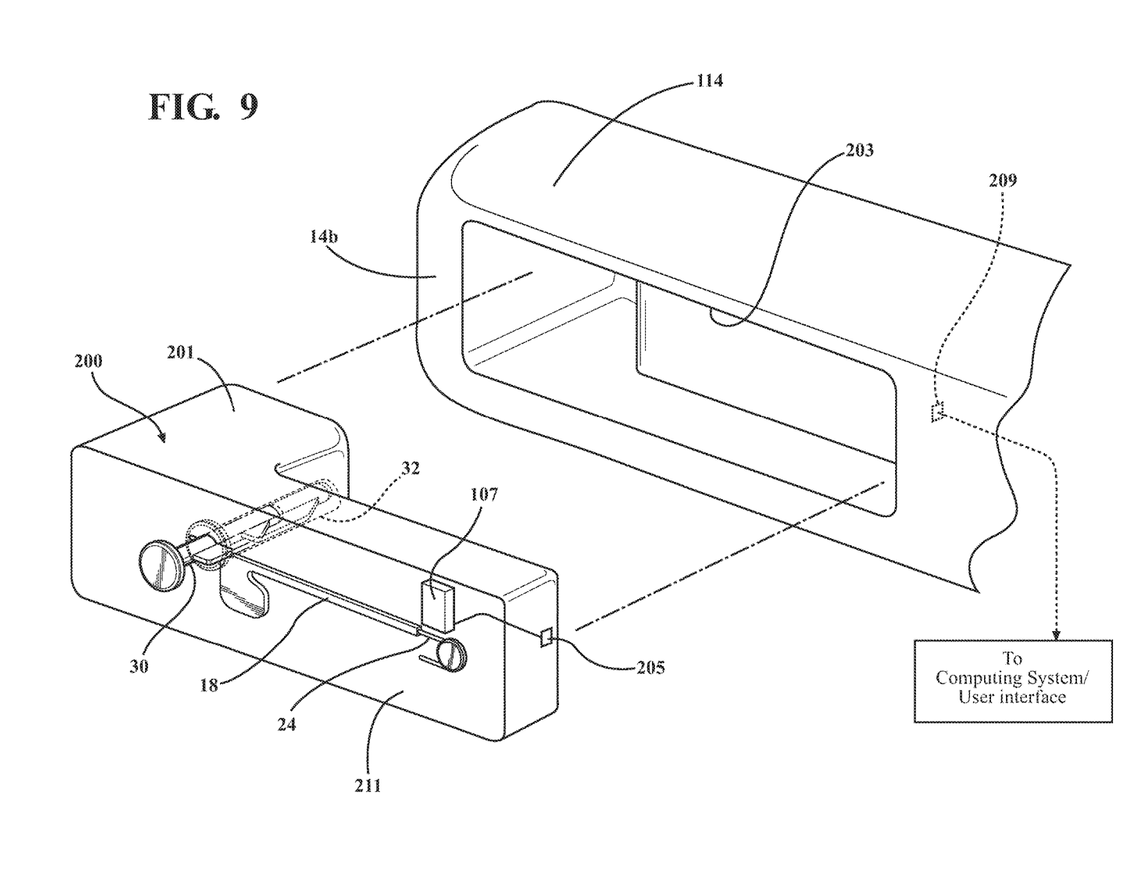
FIG. 9 is a schematic perspective view of a bumper damage indication system module which may be incorporated into a vehicle bumper.

Referring to FIG. 9, in one or more arrangements, elements of the bumper damage indication system previously described may be incorporated into a housing 201 formed separately from the bumper 14 and structured to be positionable within a bumper 114. The damage indicator 18 may be mounted on the housing so as to reside between the housing 201 and the body 16 of the vehicle when the housing 201 is positioned in the bumper 114. The housing 201 and elements incorporated therein may form a bumper damage indication system module 200, which may be positioned, for example, inside a suitable cavity 203 formed in the bumper 114 and operatively connected to the user interface 99 as described herein.

The module 200 may include an electrical connection mechanism 205 (such as a connector, for example) structured for electrically coupling the switch 107 to a mating connection mechanism 209 located in the bumper 114. The connection mechanism 209 may be electrically coupled to the interface coupling mechanism 97, computing system 15, and user interface 103 as previously described. Alternatively, the switch may be electrically coupled to the coupling mechanism 97/computing system 15/user interface 103 using another method. The housing 201 may be structured so that a surface 211 from which the retainer 30 extends prior to actuation of the damage indication system may be flush with the surface 14b of the bumper. Then, the elements of the damage indication system may operate as if they are attached separately to the bumper, as previously described.

The elements of the bumper damage indication system mounted in the module may operate in the same manner as the same elements separately attached to the bumper 14 and previously described. The module 200 may enable the bumper damage indication system components to be more easily positioned within a bumper or installed in a vehicle. In addition, the modular construction may more easily enable an embodiment of the bumper damage indication system to be retrofit into an existing bumper design.

As will be appreciated by one skilled in the pertinent art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data, instructions or events as described herein may be transferred between a source and a destination in the form of electromagnetic waves traveling through signal-conducting media such as metal wires, optical fibers, and/or wireless transmission media (e.g., air and/or space).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle bumper damage indication system comprising:
a damage indicator structured to be positionable in a space between a bumper of a vehicle and a body of the vehicle, the damage indicator being structured to be movable between a first configuration and a second configuration; and
an actuation mechanism operatively coupled to the damage indicator and structured to control movement of the damage indicator from the first configuration to the second configuration responsive to a predetermined amount of deflection of a portion of the bumper,
wherein, in the second configuration, the damage indicator extends outwardly from the space between the vehicle bumper and the vehicle body so as to provide a visual indication of bumper deflection.

2. The bumper damage indication system of claim 1 wherein the actuation mechanism comprises an actuator operatively coupled to the damage indicator and structured to exert a biasing force on the damage indicator biasing the damage indicator toward the second configuration.

3. The bumper damage indication system of claim 2 wherein the actuator is mounted to a housing formed separately from the bumper.

4. The bumper damage indication system of claim 2 wherein the actuation mechanism further comprises a retainer operatively coupled to the damage indicator, the retainer being structured to maintain the damage indicator in the first configuration against the biasing force exerted by the actuator, prior to the predetermined amount of deflection of the portion of the bumper.

5. The bumper damage indication system of claim 4 further comprising a cavity structured for receiving the retainer therein, wherein the bumper damage indication system is structured such that the retainer is in a first position within the cavity in which the retainer extends a first distance toward the body of the vehicle from a surface of the bumper facing the vehicle body when the retainer is maintaining the damage indicator in the first configuration, and such that deflection of the portion of the bumper the predetermined amount moves the retainer to a second position within the cavity in which the retainer extends a second distance toward the vehicle body from the surface of the bumper facing the vehicle body, the second distance being less than the first distance, and wherein movement of the retainer to the second position permits the actuator biasing force to move the damage indicator from the first configuration to the second configuration.

6. The bumper damage indication system of claim 5 wherein the cavity is formed in the bumper.

7. The bumper damage indication system of claim 5 wherein the cavity is formed in a housing formed separately from the bumper.

8. The bumper damage indication system of claim 5 wherein the retainer includes a breakable portion structured to maintain the retainer in the first position prior to the predetermined amount of deflection of the portion of the bumper, and wherein the bumper damage indication system is structured such that occurrence of the predetermined amount of deflection of the portion of the bumper causes the retainer to contact the vehicle body, thereby forcing the retainer from the first position toward the second position and producing breakage of the breakable portion.

9. The bumper damage indication system of claim 5 wherein the retainer includes a body portion and a damage indicator engagement portion extending from the body portion, the damage indicator engagement portion being structured to engage the damage indicator when the retainer is positioned in the first position, to maintain the damage indicator in the first configuration, and wherein the damage indicator engagement portion is structured to disengage from the damage indicator when the retainer moves from the first position to the second position within the cavity, thereby enabling the damage indicator to move from the first configuration to the second configuration.

10. The bumper damage indication system of claim 1 wherein the damage indicator is structured to reside in the first configuration prior to the predetermined amount of deflection of the portion of the bumper.

11. The bumper damage indication system of claim 1 wherein a portion of the damage indicator extends above an uppermost exterior surface of the bumper when the damage indicator is in the second configuration.

12. The bumper damage indication system of claim 11 wherein the damage indicator resides below the uppermost exterior surface of the bumper when the damage indicator is in the first configuration.

13. A vehicle bumper damage indication system comprising:
 a damage indicator structured to be positionable in a space between a bumper of a vehicle and a body of the vehicle, the damage indicator being structured to be movable between a first configuration and a second configuration;
 an actuation mechanism operatively coupled to the damage indicator and structured to control movement of the damage indicator from the first configuration to the second configuration responsive to a predetermined amount of deflection of a portion of the bumper; and
 a user interface coupling mechanism structured to operatively coupling the damage indicator to a vehicle user interface, the user interface coupling mechanism being configured to provide an indication that the damage indicator is in the second configuration.

14. The bumper damage indication system of claim 13 wherein the user interface includes a head-up display configured to provide the indication that the damage indicator is in the second configuration.

15. The bumper damage indication system of claim 13 wherein the user interface coupling mechanism comprises an electrical switch structured to be closed by positioning of the damage indicator in the second configuration.

16. A vehicle bumper damage indication system comprising:
 a damage indicator structured to be positionable in a space between a bumper of a vehicle and a body of the vehicle, the damage indicator being structured to be movable between a first configuration and a second configuration;
 an actuation mechanism operatively coupled to the damage indicator and structured to control movement of the damage indicator from the first configuration to the second configuration responsive to a predetermined amount of deflection of a portion of the bumper; and
 a housing formed separately from the bumper and structured to be positionable within the bumper, wherein at least the damage indicator and the actuation mechanism are incorporated into the housing.

17. A bumper damage indication system structured to detect at least a predetermined amount of deflection of a portion of a vehicle bumper, the system comprising:
 a damage indicator structured to be positionable in a space between a bumper of a vehicle and a body of the vehicle, and structured to be movable between a first configuration and a second configuration;
 a spring member operatively coupled to the damage indicator and structured to bias the damage indicator toward the second configuration, the second configuration being indicative of an occurrence of the at least a predetermined amount of deflection of the portion of the bumper; and
 a retainer operatively coupled to the damage indicator and structured to engage the damage indicator to maintain the damage indicator in the first configuration against a force exerted by the spring member prior to an occurrence of the at least a predetermined amount of deflection of the portion of the bumper, the retainer being structured for insertion into a cavity,
 wherein the damage indication system is structured such that the retainer extends to a first position within the cavity in which the retainer extends a first distance toward the vehicle body from a surface facing the vehicle body when the retainer is maintaining the damage indicator in the first configuration,
 wherein the damage indication system is structured such that deflection of the bumper by the at least the predetermined amount causes the retainer to move to a second position within the cavity in which the retainer extends a second distance toward the vehicle body from the surface facing the vehicle body, the second distance being less than the first distance,
 and wherein movement of the retainer to the second position disengages the retainer from the spring member, thereby permitting the spring member to move the damage indicator from the first configuration to the second configuration.

18. The bumper damage indication system of claim 17 wherein the damage indication system is structured such that the damage indicator resides in the space between the bumper and the vehicle body when the damage indicator is in the first configuration, and such that at least a portion of the damage indicator resides above an uppermost exterior surface of the bumper when the damage indicator is in the second configuration.

19. A vehicle bumper damage indication system comprising:
 a housing structured to be positionable in a bumper opposite a body of a vehicle;
 a damage indicator mounted on the housing so as to reside between the housing and the body of the vehicle when the housing is positioned in the bumper, the damage indicator being movable between a first configuration and a second configuration; and
 an actuation mechanism mounted on the housing and structured to maintain the damage indicator in the first configuration prior to occurrence of at least a predetermined amount of deflection of a portion of the bumper, and structured to cause the damage indicator to move from the first configuration to the second configuration upon occurrence of the at least a predetermined amount of deflection of the portion of the bumper, wherein the second configuration indicates the occurrence of the at least a predetermined amount of deflection of the portion of the bumper.

\* \* \* \* \*